(12) United States Patent
Brash

(10) Patent No.: US 12,140,797 B2
(45) Date of Patent: Nov. 12, 2024

(54) SINGLE PHOTON SOURCES

(71) Applicant: AEGIQ LTD, Sheffield (GB)

(72) Inventor: Alistair James Brash, Sheffield (GB)

(73) Assignee: THE UNIVERSITY OF SHEFFIELD, Sheffield (GB)

( * ) Notice: Subject to any disclaimer, the term of this patent is extended or adjusted under 35 U.S.C. 154(b) by 298 days.

(21) Appl. No.: 17/753,747

(22) PCT Filed: Sep. 11, 2020

(86) PCT No.: PCT/GB2020/052193
§ 371 (c)(1),
(2) Date: Mar. 14, 2022

(87) PCT Pub. No.: WO2021/048560
PCT Pub. Date: Mar. 18, 2021

(65) Prior Publication Data
US 2022/0381979 A1  Dec. 1, 2022

(30) Foreign Application Priority Data
Sep. 13, 2019  (GB) .................... 1913278

(51) Int. Cl.
  *G02B 6/126* (2006.01)
  *G02B 6/122* (2006.01)
(52) U.S. Cl.
  CPC ........... *G02B 6/126* (2013.01); *G02B 6/1225* (2013.01)
(58) Field of Classification Search
  CPC ................ G02B 6/126; G02B 6/1225
  See application file for complete search history.

(56) References Cited

U.S. PATENT DOCUMENTS

| 10,247,969 B1 | 4/2019 | Bonneau et al. |
| 10,352,856 B2 * | 7/2019 | Rivera ............... G01N 21/636 |
| 2001/0016095 A1 | 8/2001 | Tomita |
| 2009/0114925 A1 | 5/2009 | Ajiki et al. |
| 2010/0232279 A1 | 9/2010 | Stevenson et al. |
| 2012/0326116 A1 | 12/2012 | Ellis et al. |

(Continued)

FOREIGN PATENT DOCUMENTS

| GB | 2561590 A | 10/2018 |
| JP | 201939984 A | 3/2019 |

OTHER PUBLICATIONS

UK Intellectual Property Office Combined Search and Examination Report dated Dec. 10, 2021.

(Continued)

*Primary Examiner* — Tina M Wong
(74) *Attorney, Agent, or Firm* — William J. Clemens; Shumaker, Loop & Kendrick, LLP

(57) ABSTRACT

A single photon source comprises a photon emitter (10), an excitation waveguide (30) arranged to direct excitation photons having a first polarisation direction into the photon emitter, and a collection waveguide (42) arranged to collect photons having a second polarisation direction from the photon emitter. The first polarisation direction is coupled to a first exciton state of the photon emitter and the second polarisation direction is non-parallel to the first polarisation direction and is coupled to a second exciton state of the photon emitter, and the first and second exciton states have substantially equal energies.

17 Claims, 4 Drawing Sheets

(56) References Cited

U.S. PATENT DOCUMENTS

2013/0256504 A1    10/2013   Stevenson et al.

OTHER PUBLICATIONS

UK Intellectual Property Office Combined Search and Examination Report dated Mar. 13, 2020.
International Search Report dated Jan. 12, 2021.
P. Yao, P. Pathak, V. S. C. Mango Rao, S. Hughes, "Theory and design of chip-based quantum light sources using planar photonic crystals." Proc. SPIE 7211, Physics and Simulation of Optoelectronic Devices XVII, 72110B (Feb. 24, 2009); doi: 10.1117/12.816146.
Coles, R.J. et al. "Waveguide-coupled photonic crystal cavity for quantum dot spin readout." Optics Express 2376, 10, Feb. 2014, vol. 22, No. 3, DOI: 10.1364/OE22.002376 to OE.002385.
Heinz, Dirk et al. "A quantum dot single-photon source with on-the-fly all-optical polarization control and time emission." Nature Communications, 6:8473, DOI: 10.1038/ncomms9473, Oct. 5, 2015, pp. 1-6.

\* cited by examiner

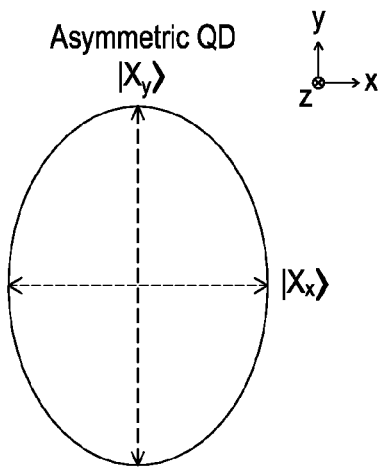
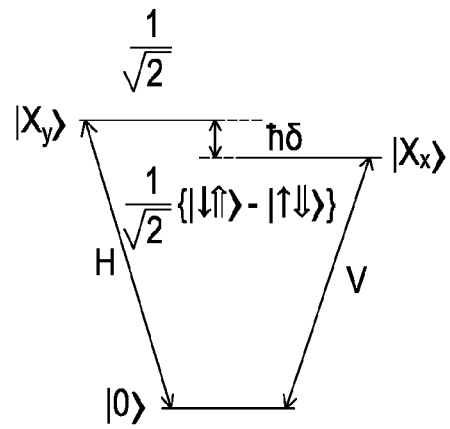
Fig. 1a
Fig. 1b
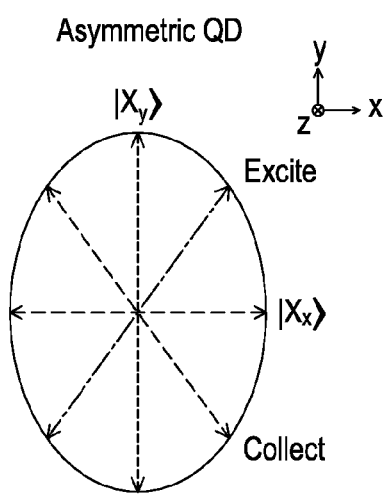
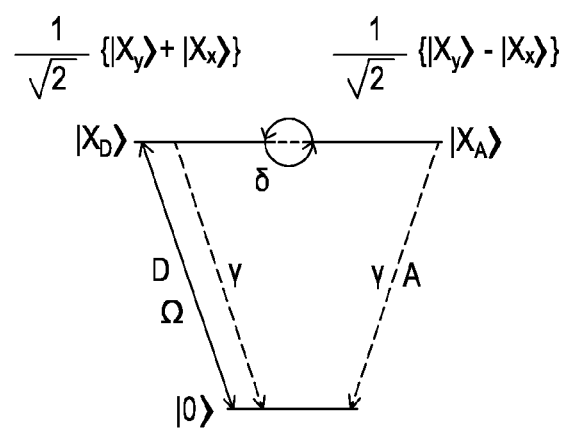
Fig. 2a
Fig. 2b

# SINGLE PHOTON SOURCES

FIELD OF THE INVENTION

The present invention relates to single photon sources (SPSs), and in particular to optically triggered single photon sources. It has application in a number of fields, such as quantum cryptography, optical quantum computation, optical quantum metrology, and optical quantum simulators.

BACKGROUND

Single-photon sources (SPSs), in general, can be characterised as emitting a single photon at each trigger event, providing deterministic generation, i.e. every trigger event generates a photon, producing no entanglement between photons by default but multiple emitters can be used to generate entanglement. SPSs can be triggered optically or electrically.

A number of methods of making SPSs have been suggested. Quantum dot (QD)-based devices have emerged as a primary source of high-quality indistinguishable SPSs suitable for quantum applications. QDs exhibit discrete exciton energy levels. When an exciton decays it emits a single photon. In these systems, QDs are placed inside photonic structures, such as photonic crystal (PhC) waveguides, to extract SPS emission (see, e.g. P. Lodahl, "Quantum-dot based photonic quantum networks," Quantum Sci. Technol., vol. 3, no. 1, p. 13001, 2018, and GB2378319). Optical resonators, often implemented as photonic crystal cavities (PhCC), can also be incorporated, for example in the waveguides, to impact emission properties. One option is to use the so-called Purcell enhancement of a cavity to reduce the QD exciton lifetime, increasing both the single photon emission rate and the resilience to dephasing processes such as charge noise that can compromise indistinguishability of the photons. Proof-of-principle demonstrations of this system (QD in a PhCC utilising Purcell enhancement) as suitable for generation of indistinguishable single photons at very high rates have been made.

One of the key challenges for making practical SPSs is ensuring that they are deterministic and that each photon is emitted within the smallest possible time uncertainty relative to the trigger. Resonant optical triggering schemes (i.e. with laser light of the same energy as the single-photon emission) are superior to electrical or off-resonant optical triggering as they avoid introducing intermediate electron/hole states that reduce determinism and increase time uncertainty. However, the major problem of resonant optical excitation schemes is the need to separate the driving laser from the single photon emission.

Previously it has been suggested (see e.g. "High Purcell Factor Generation of Undistinguishable On-Chip Single Photons" F. Liu et al., Nature Nanotechnology, vol. 13, p 835-840 2018; and "Polarized Indistinguishable Single Photons from a Quantum Dot in an Elliptical Micropillar" Yu-Ming He et al., arXiv:1809.10992 [physics.optics]) to use asymmetric 2D-cavities to couple orthogonally polarised photonic cavity modes to a QD; one mode to the QD exciton transition and the other to the (slightly de-tuned) laser energy, therefore building a polarisation-filtering scheme. In the systems described in both of these papers the cavity modes are aligned with the crystal axes and hence with the long and short axes of the elliptical micropillar. "Polarized Quantum Dot Cavity-QED and Single Photons" H. J. Snijders et al., arXiv:1811.10571[physics.optics] describes a system which allows the angle between the cavity and the QD states to be changed.

SUMMARY OF THE INVENTION

The present invention further provides, according to a first aspect, a photon source comprising: a photon emitter, an excitation waveguide arranged to direct excitation photons having a first polarisation direction into the photon emitter, and a collection waveguide arranged to collect photons having a second polarization direction from the photon emitter, wherein the first polarisation direction is coupled to a first exciton state of the photon emitter and the second polarisation direction is non-parallel to the first polarisation direction and is coupled to a second exciton state of the photon emitter, and the first and second exciton states have substantially equal energies.

The first polarization direction and the second polarization direction may be substantially mutually perpendicular.

The photon emitter may comprise a quantum dot. The quantum dot may be circular or oval. The quantum dot may have a short axis, and a long axis which is perpendicular to the short axis.

The excitation waveguide may be arranged to direct photons into the photon emitter in an excitation direction and the collection waveguide may be arranged to collect photons emitted from the photon source in a collection direction.

The excitation direction may be offset from the long axis by an excitation direction offset angle. The collection direction may be offset from the long axis by a collection direction offset angle. The excitation direction offset angle may be equal to the collection direction offset angle. The excitation direction offset angle and the collection direction offset angle may each be about 45°.

The photon emitter may be a colour centre in diamond, for example a nitrogen-vacancy centre or a silicon-vacancy centre, or the photon emitter may be a defect in a 2D material.

The photon source may further comprise a source of magnetic field arranged to apply a magnetic field to the photon emitter which is perpendicular to both the first and second polarisation directions.

The present invention provides, according to a first aspect, a photon source comprising: a quantum dot having a long axis, and a short axis perpendicular to the long axis, an excitation waveguide arranged to direct photons into the quantum dot in an excitation direction, and a collection waveguide arranged to collect photons emitted from the quantum dot in a collection direction, wherein the excitation direction and the collection direction are non-parallel to each other and the diameter of the quantum dot in the collection direction is substantially equal to the diameter of the quantum dot in the excitation direction.

The excitation direction and the collection direction may be substantially mutually perpendicular.

The photon source may further comprise a source of magnetic field arranged to apply a magnetic field to the photon emitter which is perpendicular to both the excitation direction and the collection direction.

The waveguides in either aspect of the invention may be arranged at least partly to form at least one reflector thereby to form a photonic crystal cavity. The photonic crystal cavity may comprise just one reflector, or it may comprise two reflectors, one on each side of the cavity, with one of the reflectors being more strongly reflecting than the other. In this way the photonic crystal cavity may be asymmetric so as to induce Purcell enhancement of the emission of photons into the collection waveguide. The reflector may comprise a Bragg reflector.

BRIEF DESCRIPTION OF THE DRAWINGS

FIGS. 1a and 1b show the exciton energies of exciton states associated with orthogonal excitation polarization directions aligned with the crystallographic axes of an asymmetric quantum dot;

FIGS. 2a and 2b show the exciton energies of exciton states associated with orthogonal excitation polarization directions at 45° to the crystallographic axes of an asymmetric quantum dot;

DETAILED DESCRIPTION

Figure 3:
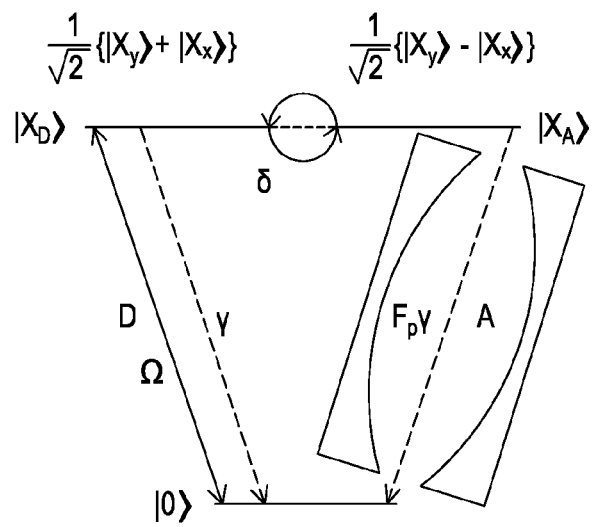
FIG. 3 schematically shows Purcell enhancement of one of the transitions of the arrangement of FIGS. 2a and 2b.
Figure 4A:
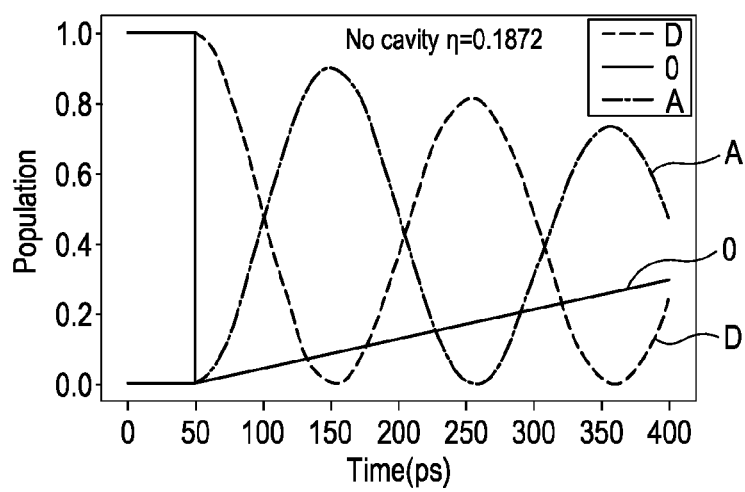
FIG. 4a shows the fine structure oscillation and exciton decay rate in the arrangement of FIGS. 2a and 2b without Purcell enhancement.
Figure 4B:
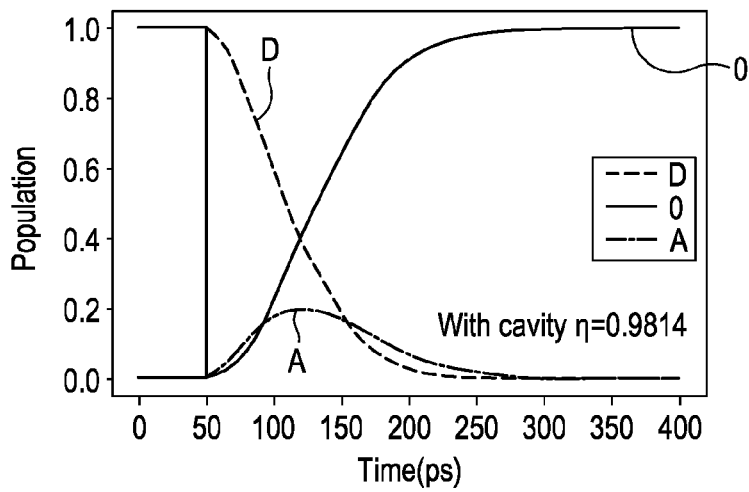
FIG. 4b shows the fine structure oscillation and exciton decay rate in the arrangement of FIGS. 2a and 2b with Purcell enhancement.

Referring to FIG. 1a, a quantum dot (QD) 10 of a group III arsenide, such as InGaAs, InAlAs, or InAS is grown by a self-assembling growth technique on a substrate, which may comprise GaAs or AlGaAs, (or InP if the QD is for use in telecommuncations applications) which results in an asymmetrical QD having a long axis y, which is along the longest diameter of the QD in the plane of the substrate, and a short axis x, which is the shortest diameter of the QD in the plane of the substrate, and perpendicular to the long axis. The long and short axes x, y are aligned with the crystallographic axis of the substrate and the QD.

In such a dot there are various electron energy bands, and an electron can be excited from one band up to a higher energy band, leaving a hole in the lower band. The combination of the electron and the hole is referred to as an exciton and the exciton has an energy associated with it, which is the transition energy of the electron between the bands. Different spin states of the electron and hole correspond to different orientations within the QD. The direction of spin of the electron is represented by the simple arrow T and the direction of spin of the hole is represented by the open arrow ⇑. Orientations that lie along the long and short axes are termed $X_y$ and $X_x$ respectively. In this case, the differing size of the electron confinement potentials gives rise to a fine structure splitting (FSS) between the energies of the two exciton states Xx and Xy. This FSS is shown in FIG. 1b. Transitions to and from different spin states are associated with photons of different polarisation directions, and so in the arrangement of FIG. 1, the x and y exciton resonances couple to photons of different energies and different polarizations. Light entering the QD will generally be polarized in the direction parallel to the plane of the substrate (and perpendicular to the direction of propagation). Therefore if the excitation laser pulses are directed in the H direction there will in general be no emission in the V direction because there is no way for the exciton to switch between the x and y states.

Referring to FIG. 2a, it is possible to describe the QD in any other orthogonal polarisation basis, such as diagonal-anti-diagonal (D-A), which is rotated by 45 degrees relative to the V-H basis of FIG. 1 above. The D and A directions are interchangeable in this arrangement. In this energy scheme, laser excitation can be directed from one direction having polarisation in one direction, the D direction, and emitted and collected photons can have an orthogonal polarisation in the A direction and equal energy to the exciting photons as shown in FIG. 2b. In this D-A basis, exciton states will be $|X_D\rangle$ and $|X_A\rangle$ with corresponding decay rates $\gamma_D$ and $\gamma_A$, which will be equal in absence of any other external constrains.

Using the D and A directions to excite and collect means that the excitation direction and the collection direction are offset from the long axis of the QD by the same angle, in this case 45°. It will be appreciated that, provided the excitation and collection directions are offset from the long axis by equal angles, the excitation and collection exciton energies would potentially be equal. However if the excitation and collection directions are both offset from the long axis of the QD by an angle less than 45° or more than 45°, then the polarizations of the excitation and collection photons are no longer perpendicular and some cross-talk between the excitation and collection photons (i.e. between the waveguides in which those photons are transmitted as will be described below) occurs.

A D-polarised short resonant laser pulse (with Rabi frequency $\Omega(t)$ and pulse-area of $\pi$) creates a population of 1 in the $|X_D\rangle$ state. The system will then oscillate with frequency $\delta$ (defined by the FSS–$\hbar\delta$) between $|X_D\rangle$ and $|X_A\rangle$ states with a decay rate from each one to the ground state, of $\gamma=\gamma_D=\gamma_A$ as shown in FIG. 3a. Here, population of the ground state $|0\rangle$ effectively means the cumulative probability of the single-photon emission in time, which in the absence of Purcell enhancement occurs on a timescale of approximately 1 nanosecond. Since the FSS oscillation is much faster than this, half of the single photons are emitted from each of the $|X_D\rangle$ and $|X_A\rangle$ states, and hence half of the emitted photons have D polarization and half have A polarization. After including out-of-plane losses ($\approx$30%) and non-directional emission, the collection efficiency (q) from the end of a waveguide coupled to the $|X_A\rangle$ state is 0.187 for realistic parameters.

The QD may be placed in a photonic structure arranged to transmit exciting photons into the QD and to collect emitted photons from the QD, with the photonic structure arranged to form waveguides such that A and D exciton states of the QD couple to the polarizations of the different waveguides. In this case, the first, D-polarised, waveguide delivers laser excitation pulses, and the second, A-polarised, waveguide is used to extract the emission. The second waveguide can also have an embedded resonator, Purcell enhancing only the $|X_A\rangle$ transition, as shown schematically in FIG. 3. If the resulting lifetime of the transition, $1/F_p\gamma_A$, is shorter than or comparable to the period of the FSS oscillation ($1/\delta$), then after the first half-period of that oscillation when all of the 'population' revolves to the $|X_A\rangle$ state it all (98-99% in the case of realistic parameters) decays producing an A-polarised photon emission as shown in FIG. 3b.

Figure 5:
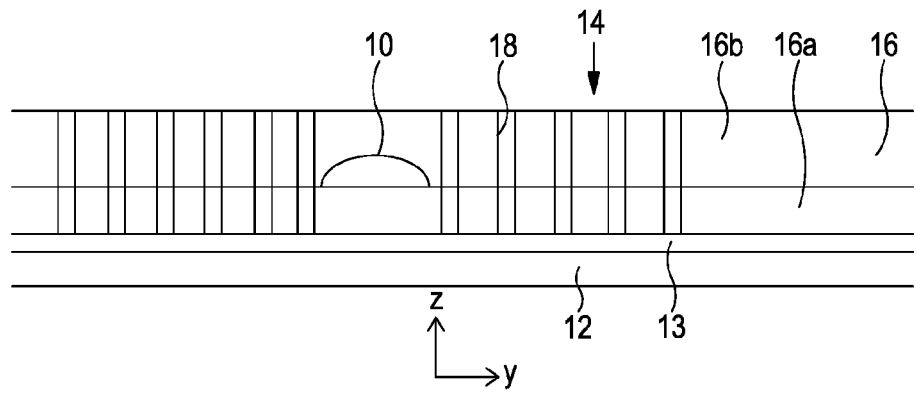
FIG. 5 is a section through a SPS according to an embodiment of the invention.
Figure 6:
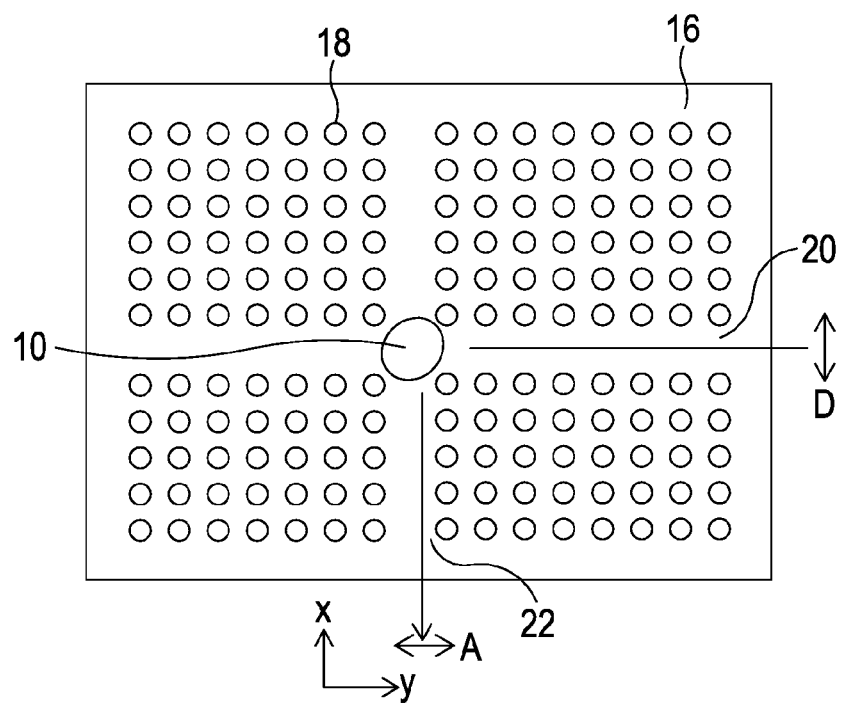
FIG. 6 is a plan view of the SPS of FIG. 5.

Referring to FIGS. 5 and 6, in one arrangement arranged to operate as described above with reference to FIGS. 2a and 2b, a single photon source may comprise a photon emitter in the form of a QD 10 as described above comprising a first material, such as InAs grown within a membrane 16 of a second material such as GaAs and having a long axis y and a short axis x (perpendicular to the plane of FIG. 5). The membrane 16 is grown so as to form a photonic crystal structure 14 around the QD 10. To form the structure, a sacrificial layer 13 of a third material such as AlGaAs is grown on the surface of a substrate 12. A first layer 16a of the GaAs membrane material is then grown over the sacrificial layer 13. The QD 10 is then grown on the first membrane layer 16a. Growth of the InAs on the GaAs results in the InAs forming into a number of QDs, one of which may be selected for use in the SPS. An array of holes 18 is then formed through the membrane material, using the selected QD 10 as the centre point. The holes 18 are formed by conventional methods which typically include creating a mask over the layer 16, centred on the selected QD 10, by photolithography and etching the holes followed by removing the mask. As well as etching the holes 18, the etching step may also etch away the sacrificial layer 13, leaving the membrane with the holes 18 through it and the QDs 10 supported within it. As can be seen in FIG. 6, the holes 18 are formed in a regular array but with two perpendicular paths 20, 22 extending through the array in which the holes 18 are not formed. These two paths form a stimulation waveguide 20 and a collection waveguide 22 extending through the layer 16 perpendicular to each other and crossing at the centre of the QD 10. The waveguides 20, 22 both extend in directions which are at 45° to the long axis y and the short axis x of the QD 10.

In operation, stimulation laser pulses are transmitted along the stimulation waveguide 20 having polarisation in the D direction, and photons are collected on the collection waveguide 22 having polarisation in the A direction.

Figure 7:
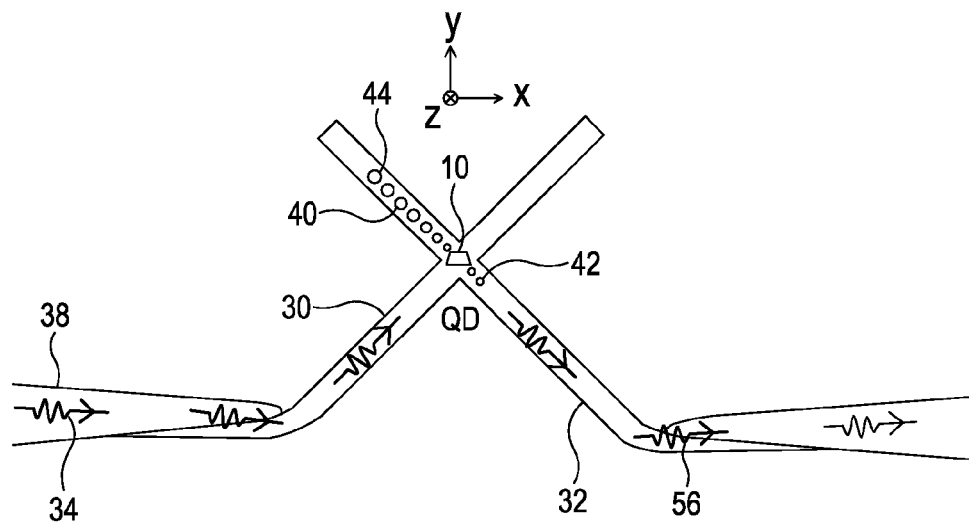
FIG. 7 is a plan view of an SPS according to a further embodiment of the invention.

Referring to FIG. 7, an alternative arrangement for realising the structure of FIGS. 2a and 2b is to form the QD 10, for example of InAs on a layer 16a of, for example, GaAs as with FIGS. 5 and 6, but then to form nanobeam waveguides 30, 32 on the GaAs layer 16a and over the QD 10. Each of the nanobeam waveguides 30, 32 comprises a straight strip of material, which is typically the same as the layer 16a, and therefore GaAs, formed by photolithography. Further layers, for example of AlGaAs, may be included for their electrical properties. The two waveguides 30, 32 extend in mutually perpendicular directions and cross at the point where the QD 10 is formed. As with the embodiment of FIGS. 5 and 6, in this example the QD asymmetry is pinned to x-y axes, defined by GaAs crystallographic orientation. The waveguide photonic structure axes are in-plane, i.e. parallel to the plane of the substrate, but each oriented at 45 degrees to the x-y axes. The D-aligned waveguide 30 forms the excitation waveguide and is used for delivering trigger laser pulses 34 polarised in the D direction, and the A-aligned waveguide 32 forms the collection waveguide and is used to collect photons 36 polarised in the A direction. Each of the waveguides 30, 32 may be coupled to the tapered end of an optical fibre 38 through which the laser stimulation pulses and collected photons are transmitted to and from the device.

In order to provide Purcell enhancement of the emission of photons into the collection waveguide 32, a resonator may be provided in at least one of the waveguides 30, 32. For example the excitation waveguide 30, which couples only to the $|X_D\rangle$ transition, may not be provided with a resonator and. The orthogonal, A-aligned collection waveguide 32, which couples to the $|X_A\rangle$ transition may have an asymmetric photonic crystal cavity which induces Purcell enhancement. This cavity may be formed by forming a Bragg reflector 40 on one side of the QD 10, and a weaker Bragg reflector 42 on the opposite side of the QD 10, with the two reflectors facing each other. The Bragg reflector 40 may be formed as a plurality of holes 44 formed in the waveguide with a regular spacing and aligned along the centre of the waveguide. This effectively prevents any emission of photons along the collection waveguide 32 in one direction which is opposite to the collection direction. The weaker Bragg reflector 42 comprises a similar array of holes, but fewer in number. This allows photons to be emitted along the collection waveguide in one direction, which is the collection direction. The asymmetry of the cavity leads to nearly 100% directional emission of the single photons in the collection direction. The excitation waveguide 30 may have no resonator formed in it at all, as shown in FIG. 7, or it may have a low Q factor resonator, formed for example as a single hole formed on each side of the QD 10. This will reduce the laser power required to achieve a "π-pulse", but may also increase the probability of emission along the excitation waveguide 30.

In addition to the reflector(s) formed in the collection waveguide 32, a pair of reflectors may be formed in the excitation waveguide, one on each side of the QD 10. In this case the reflectors are arranged to form a resonator with a central frequency that is detuned from the exciton energy by several times greater than the spectral width of the resonator mode. In this way, the emission of the QD into the excitation waveguide may be "Purcell supressed", offering potentially even greater efficiency into the collection waveguide, though at the expense of requiring additional excitation power.

Referring back to FIGS. 5 and 6, while no resonators are shown in those figures, they may be included in the form of further holes in the collection (and excitation) waveguides 20, 22 having the same configuration as the holes 44 of FIG. 7.

The embodiments of FIGS. 5 to 7, which involve the positioning of an asymmetric quantum dot in a particular design of wave guide, enable the input of source photons and the output of photons that have the same energy. They also provide an integrated on-chip filtering capability that does not require polarisers or spectral filters (which compromise the deterministic nature of the SPS by introducing loss) and has a total efficiency close to unity for realistic parameters. They can therefore also provide SPSs with high repetition rate, which is of a crucial importance since it is essential for large-scale on-chip photon de-multiplexing, which is an industry target of a proof-of-concept on-chip quantum computing device (see e.g. Nature Photon. 11, 361-365 (2017)) and then would be required for the future devices. Also, given that quantum systems are extremely sensitive to the noise in the environment, the number of error-free operations decreases exponentially with time, so ten times faster repetition rate provides even more dramatic theoretical increase in productivity. Finally, a higher repetition rate source also increases both the achievable range and bit-rate for secure quantum key distribution (QKD) with single photons.

Figure 8:
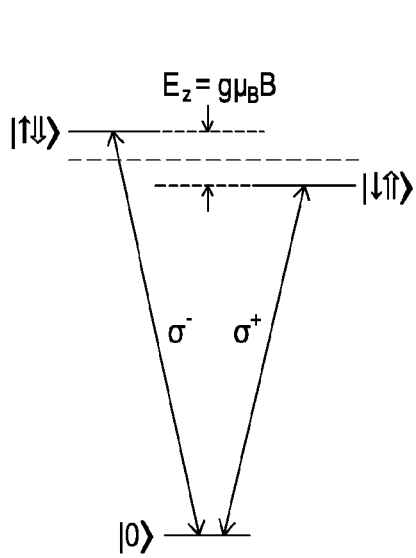
FIG. 8 shows the exciton energies of exciton states associated with different electron spin states in an applied magnetic field.
Figure 9:
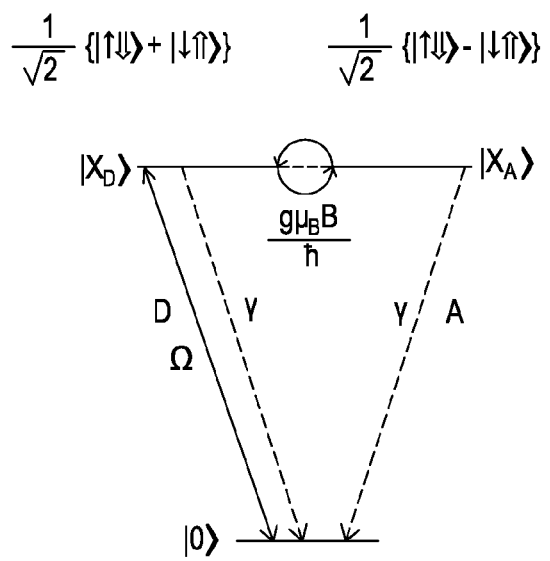
FIG. 9 shows the exciton energies of exciton states associated with alternative electron spin states in an applied magnetic field.

Referring back to FIGS. 5 and 6, in a further embodiment the quantum dot 10 is round rather than oval and a magnetic field B is applied in the z direction, i.e. perpendicular to the plane of the waveguides. This gives rise to an energy diagram as shown in FIG. 8. There are two circularly-polarised exciton states, one σ+ with the electron spin parallel to the magnetic field and one σ− with the electron spin anti-parallel to the magnetic field. The direction of spin of the electron is represented in FIG. 8 by the simple arrow ↑ and the direction of spin of the hole is represented by the open arrow ⇑. These two states have different energies as shown in FIG. 8. The difference between the two energies is the Zeeman energy, where the Zeeman energy $E_Z=g\mu B$ where g is the exciton "g-factor", μ is the Bohr magneton and B is the magnitude of the applied magnetic field. Referring to FIG. 6, if an exciting photon is directed along the excitation waveguide, with polarisation in the x-y plane and perpendicular to the magnetic field B, then the exciton will have electron and hole spin directions perpendicular to the magnetic field. This corresponds to a linearly polarised state of the exciton and can be considered as a superposition of the two circularly polarised exciton states shown in FIG. 8, and this linearly polarised state will have an energy which is an average of the energies of the two states shown in FIG. 8, as shown in FIG. 9. Once excited into this state, the electron (and hole) will precess about the magnetic field between one state $X_D$ which is coupled to the excitation waveguide, and another state $X_A$ which is coupled to the collection waveguide. The frequency of precession depends on the strength of the magnetic field, and is given by gμB/h rather (rather than δ in the embodiment of FIGS. 5 and 6 described above). It will be appreciated that, while the excitation and collection waveguides should be mutually perpendicular in this arrangement, to avoid cross-talk between them, the waveguides can be at any orientation within the plane of the photonic crystal structure, relative to the quantum dot.

While the embodiment described above uses a circular quantum dot, a similar result can be achieved using an oval quantum dot as shown in FIGS. 1a and 2a provide the magnetic field is strong enough so that the Zeeman energy split shown in FIG. 8 is significantly greater than the fine structure energy split shown in FIG. 1b.

In further alternative arrangements, rather than a quantum dot 10, other types of photon emitter may be used in combination with a magnetic field. For example the photon emitter may comprise a diamond crystal with a defect, such as a nitrogen-vacancy centre or a silicon-vacancy centre. In these defects, in particular negatively charged nitrogen-vacancy centres, electrons can be excited into various exciton states which can be coupled with polarized light in the excitation and collection waveguides in the same way as described above with reference to FIGS. 5 to 7. In a structure similar to that of FIGS. 5 and 6 with a nitrogen-vacancy centre in diamond in place of the QD 10, a magnetic field may be applied in the z direction, i.e. perpendicular to the plane of the waveguides, using suitably located electromagnets, which gives rise to two circularly polarized eigenstates as described above with reference to FIG. 8. In this case the device operates in a similar manner to that described above.

In either of the arrangements described above using a magnetic field, the structure of the device may be as shown in FIGS. 5 and 6, or as shown in FIG. 7

As a further alternative to the colour centres in diamond, defects in 2D materials (e.g. hexagonal boron nitride (hBN)) may also be used as the photon emitter. In this case the photonic crystal structure similar to that of FIGS. 5 and 6 may be formed of silicon nitride, and a flake of the 2D material placed on the location of the quantum dot 10 of FIGS. 5 and 6. The 2D emitter then evanescently couples to the photonic crystal cavity.

While the use of a magnetic field to provide the split energy levels as in FIG. 8 has the advantage that the magnetic field can easily be varied to control the energy levels, the requirement to provide a magnetic field typically makes such systems larger and more complex than the systems of FIGS. 1a to 2b, which therefore have advantages in many applications.

The invention claimed is:

1. A photon source comprising:
a photon emitter;
an excitation waveguide arranged to direct excitation photons having a first polarization direction into the photon emitter; and
a collection waveguide arranged to collect photons having a second polarization direction from the photon emitter, wherein the first polarization direction is coupled to a first exciton state of the photon emitter and the second polarization direction is non-parallel to the first polarization direction and is coupled to a second exciton state of the photon emitter, and the first and second exciton states have substantially equal energies.

2. The photon source according to claim 1 wherein the first polarization direction and the second polarization direction are substantially mutually perpendicular.

3. The photon source according to claim 1 wherein the photon emitter comprises a quantum dot.

4. The photon source according to claim 3 wherein the quantum dot has a short axis and a long axis that is perpendicular to the short axis.

5. The photon source according to claim 1 wherein the excitation waveguide is arranged to direct the excitation photons into the photon emitter in an excitation direction and the collection waveguide is arranged to collect the photons emitted from the photon source in a collection direction.

6. The photon source according to claim 5 wherein the photon emitter comprises a quantum dot having a short axis and a long axis that is perpendicular to the short axis, wherein the excitation direction is offset from the long axis by an excitation direction offset angle and the collection direction is offset from the long axis by a collection direction offset angle, and wherein the excitation direction offset angle is equal to the collection direction offset angle.

7. The photon source according to claim 1 wherein the photon emitter is a color center in a diamond.

8. The photon source according to claim 1 wherein the photon emitter is a defect in a crystal structure.

9. The photon source according to claim 1 further comprising a source of magnetic field arranged to apply a magnetic field to the photon emitter, the magnetic field being perpendicular to both of the first and second polarization directions.

10. A photon source comprising:
a quantum dot having a long axis and a short axis, wherein the long axis and the short axis lie in a common plane, and the short axis is perpendicular to the long axis;
an excitation waveguide defining an excitation direction that lies in the common plane, the excitation waveguide being arranged to direct photons into the quantum dot in the excitation direction; and
a collection waveguide defining a collection direction that lies in the common plane, the collection waveguide being arranged to collect photons emitted from the quantum dot in the collection direction, wherein the excitation direction and the collection direction are non-parallel to each other and the quantum dot has a diameter in the collection direction and a diameter in the excitation direction that is substantially equal to the diameter of the quantum dot in the collection direction.

11. The photon source according to claim 10 wherein the excitation direction and the collection direction are substantially mutually perpendicular.

12. The photon source according to claim 10 wherein the excitation direction is offset from the long axis by an excitation direction offset angle and the collection direction is offset from the long axis by a collection direction offset angle, and wherein the excitation direction offset angle is equal to the collection direction offset angle.

13. The photon source according to claim 12 wherein the excitation direction offset angle and the collection direction offset angle are each about 45°.

14. The photon source according to claim 10 further comprising a source of magnetic field arranged to apply a magnetic field to the photon emitter, the magnetic field being perpendicular to both the excitation direction and the collection direction.

15. The photon source according to claim 10 wherein the waveguides at least partly form at least one reflector thereby forming a photonic crystal cavity.

16. The photon source according to claim 15 wherein the photonic crystal cavity is asymmetric so as to induce Purcell enhancement of the emission of the photons into the collection waveguide.

17. The photon source according to claim 15 wherein the at least one reflector is a Bragg reflector.

* * * * *